Patented Mar. 9, 1937

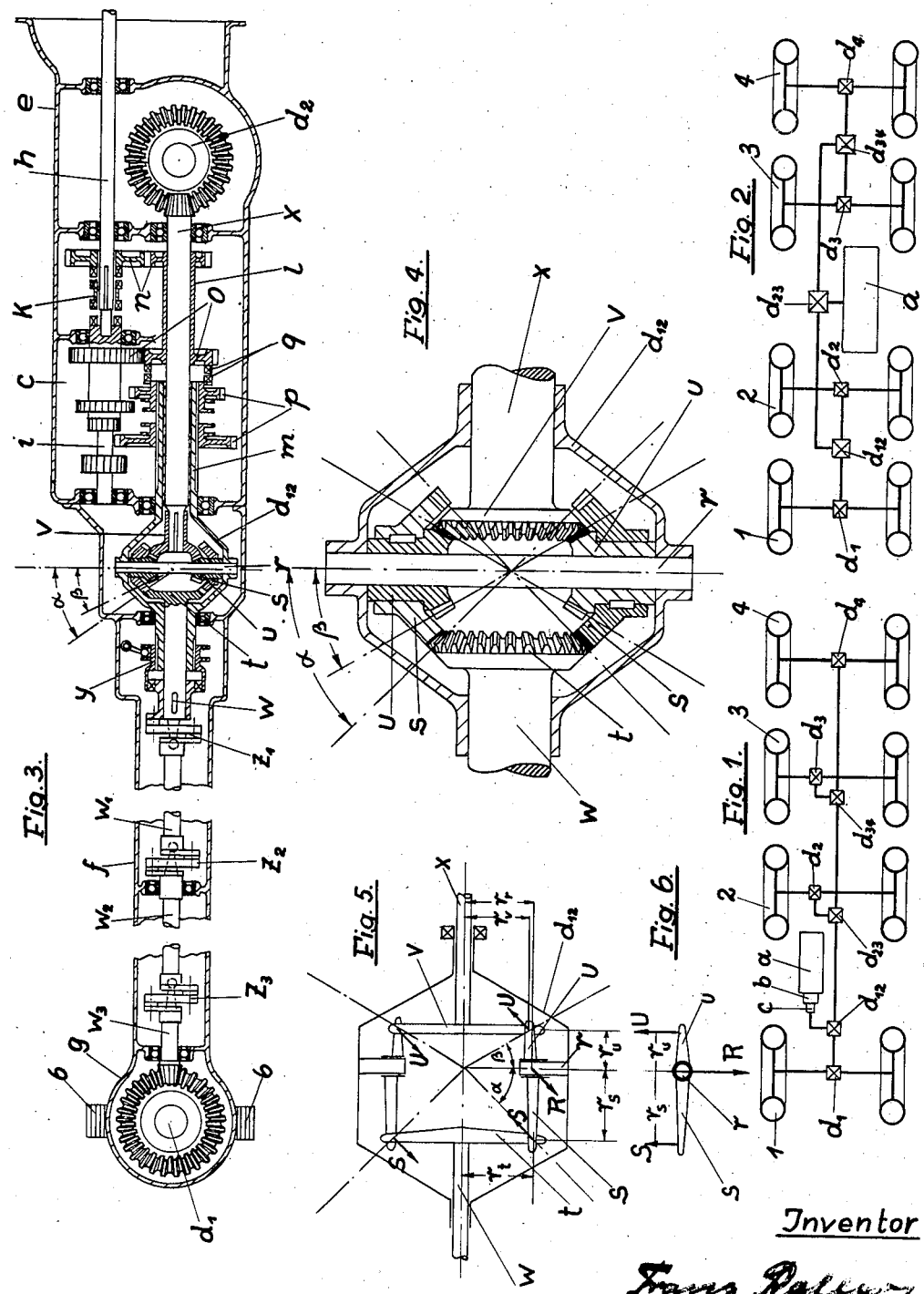

2,073,029

UNITED STATES PATENT OFFICE 2,073,029

MOTOR VEHICLE

Franz Roller, Stuttgart, Germany, assignor to Daimler Benz Aktiengesellschaft, Stuttgart-Unterturkheim, Germany Application March 11, 1935, Serial No. 10,549
In Germany March 15, 1934

1 Claim. (Cl. 74—311)

This invention relates to driving means for motor vehicles, more particularly those with two or more driven axles and a differential arrangement for distributing the driving torque, and consists substantially in this that the differential arrangement transmits the driving torque to one part of the drive, more particularly to the wheels of one axle a different torque from that which it transmits to another part of the drive, more particularly to the wheels of another axle or other axles. This arrangement makes possible a very good utilization of the adhesion of the wheels through adapting the power transmission to the loads on the wheels or the axles. Suitably this result is obtained in the case of bevel wheel differential gears through the bevel wheels which distribute the driving torque having different transmission ratios or different cone angles. The transmission ratios may be constant or variable. Where there are more than two driven axles, a differential may be disposed between each two axles. A very complete adaptation of the driving torque to the loads can be realized, if, besides the differential gears for the distribution (more particularly unequal distribution) of the torque to the individual pairs of wheels or wheel axles, there are also provided between the wheels of each pair of wheels differential gears for the distribution (more particularly unequal distribution) of the torque.

In the accompanying drawing some constructional examples of the invention are illustrated:

Figs. 1 and 2 show two possible arrangements of the drive of an eight-wheel vehicle.

Fig. 3 shows a four-wheel drive.

Fig. 4 shows the differential gear of Fig. 3 to a larger scale, and

Figs. 5 and 6 are two diagrammatic views for explaining the mode of operation of the differential gear.

In Fig. 1 $a$ is the motor, $b$ the coupling, $c$ the change speed gear, $d_{12}$ the differential gear which distributes the drive on the one hand to the front wheels $1$ and on the other hand to the six rear wheels 2, 3 and 4. The drive of the front wheels $1$ is through the differential gear $d_1$. In front of the axle of the wheels 2 is a further differential gear $d_{23}$, which transmits the drive on the one hand through the differential gear $d_2$ to the wheels 2 and on the other hand to the rearmost wheels 3 and 4. Similarly the differential gear $d_{34}$ is provided for driving the wheels 3 through the differential gear $d_3$ and the wheels 4 through the differential gear $d_4$. Thus with altogether eight driven wheels there are seven differential gears or generally with $n$ driven wheels $n-1$ differential gears. The differential gears $d_{12}$, $d_{23}$ and $d_{34}$ are suitably so constructed that the driving torque distributes itself to the individual axles according to the load acting on them. Such a construction of the individual differential gears disposed between the axles is of course also of advantage, when separate differential gears are not provided between the individual wheels of each axle. In the kind of drive illustrated the drive for the individual axles is branched off from a central driving line of shafting in the sequence in which they are arranged. The distribution of the drive might however be effected in a different manner, for instance through the drive being first distributed to each of two axles and thereupon each branch drive being divided up again to each of the two axles associated with it, as shown by way of example in Fig. 2, where the drive of the motor is distributed through the differential gear $d_{23}$ simultaneously to the differential gears $d_{12}$ and $d_{34}$. The axles may be rigid axles, swinging axles or the like.

Fig. 3 shows the constructional form of a four-wheel drive according to the invention. The motor which is not shown is fixed by flanges (Fig. 3 to the right) to the casing $e$ which contains the change speed gear $c$ and the differential gear $d_2$ for the rear axle.

This casing forms a part of the vehicle frame and is continued by the adjoining casing for the differential gear $d_{12}$ and the tube $f$ which connects the drive casing with the front axle casing $g$. In detail the drive is effected by the engine shaft $h$ which extends over and beyond the rear axle and is adapted to be coupled with the main shaft $i$ of the gear through a change over coupling $k$. The two hollow shafts $l$ and $m$ act as countershafts for the change speed gear, the arrangement being such that the shaft $l$ can be coupled on the one hand through the permanently meshing pair of toothed wheels $n$ by way of the coupling $k$ with the shaft $h$ and on the other hand through the permanently meshing pair of toothed wheels $o$ with the main shaft $i$ of the gear. The countershaft $m$ is further capable of being coupled in the usual way through slidable wheels $p$ with the main shaft $i$ of the gear. Further coupling means $q$ are also provided between the shafts $l$ and $m$.

The countershaft $m$ is rigidly connected to the differential casing $d_{12}$. In this casing is mounted the transverse pin $r$, on which are rotatable the larger bevel wheels $s$ for driving the bevel wheel $t$ and the smaller bevel wheels $u$ for driving the bevel wheel $v$. The bevel wheels $s$ and $u$ are in each case rigidly connected together to form a pair. The bevel wheel $t$ serves for driving the shaft $w$ leading to the front axle and the bevel wheel $v$ for driving the shaft $x$ leading to the rear axle.

According to the invention, more particularly as shown in Fig. 4, the teeth of the bevel wheels of the differential gear are so selected that the semi-vertical angle $\alpha$ of the bevel wheels $s$ and $t$ is greater than the semi-vertical angle of $\beta$ of the bevel wheels $u$ and $v$. The power ratios shown in Figs. 5 and 6 are thus obtained, in which the bevel wheels are replaced by similarly acting differential levers. Fig. 6 shows the two-armed differential lever $s$-$u$ in plan view. $r_s$, $r_t$, $r_u$ and $r_v$ signify the radii at which the periferal forces of the toothed wheels or levers produce a rotary motion of the same, while $r_r$ represents the lever arm, with which the differential body $d_{12}$ drives levers $s$-$u$ around the axis of the shafts $w$ and $x$.

On the lever $s$-$u$ of Figs. 5 and 6 (or the corresponding pair of toothed wheels of Fig. 4) being driven by the force R in the direction of this force, the said lever will move along evenly, without turning for instance around the pin $r$, when the lever forces S and U are in equilibrium in accordance with the lever principles. The levers $t$ and $v$ or the wheels $t$ and $v$ will consequently be turned (the pair of levers or toothed wheels $s$-$u$ remaining stationary) with the same speed of revolution about their axes, that is about the axes of the shafts $w$ and $x$.

The torque distribution is calculated as follows:
A state of equilibrium prevails, if—

$$S:U = r_u:r_s.$$

where S is the force acting at the periphery of the bevel wheel $s$ and U is the force acting at the periphery of the bevel wheel $u$.

On the other hand the torques $M_w$ and $M_x$ to be transmitted to the shafts $w$ and $x$ respectively are:

$$M_w = S.r_t \text{ and } M_x = U.r_v.$$

where $M_w$ is the torque exerted by the force S with the lever arm $rt$ on the shaft $w$ and $M_x$ is the torque exerted by the force U with the lever arm $rv$ on the shaft $x$.

From this is obtained the torque ratio at the shafts $w$ and $x$:

$$\frac{M_w}{M_x} = \frac{S}{U} \cdot \frac{r_t}{r_v} = \frac{r_u}{r_s} \cdot \frac{r_t}{r_v} = \frac{r_t r_u}{r_s r_v}$$

or:

$$M_w:M_x = \cot\alpha : \cot\beta$$

The torque transmitted by the shaft $m$ to the differential gear $d_{12}$ thus distributes itself unequally to the shafts $w$ and $x$ in the ratio of the cotangent of the angles $\alpha$ and $\beta$ or approximately in the inverse ratio of these angles, that is to say the rear axle is driven by the shaft $x$ in accordance with its heavier loading, more particularly by the weight of the driving unit with a greater torque than the front axle by the shaft $w$. This distribution of torque is independent of whether the shafts $w$ and $x$ turn at the same speed or different speeds. When the wheels turn at the same speed of revolution however there will be no relative motion of the toothed wheels with respect to one another in the differential gear.

At the left-hand end of the differential body $d_{12}$ a claw coupling $y$ (Fig. 3) is keyed on, which enables direct coupling of the differential body with the shaft $w$. This causes the action of the differential gear to cease and the shaft $m$ or the differential casing $d_{12}$ and the shafts $w$ and $x$ are rigidly coupled with one another. In the example shown the shaft $w$ does not directly drive the front axle, but is connected by any suitable universal coupling $z_1$, with a shaft $w_1$ and the latter by a universal coupling $z_2$ with a shaft $w_2$ and the latter by a further universal coupling $z_3$ with the actual driving shaft $w_3$ of the front wheels. The shaft $w_3$ may drive in the usual way the differential gear $d_1$ which through articulated shafts drives the steerable front wheels which are guided independently of one another by two superposed transverse leaf springs 6.

The drive of the rear wheels is effected directly by the shaft $x$ which extends through the hollow shafts $m$ and $l$ of the gear. The differential gear $d_2$ is disposed below the engine or coupling shaft $h$. The rear wheels are mounted for instance on swinging half-axles which swing about lateral joints of the casing and are sprung with respect to the frame, for instance by unguided helical springs.

If, in place of a differential which distributes the driving torque unequally to the different axles an ordinary differential gear with an equal drive were provided, it would not be possible, with different loads on the front and rear axles, to adapt the driving torque to these loads. But even the provision of a differential gear between each of the individual axles gives a great advantage in the case of vehicles with more than two driven pairs of wheels. In certain circumstances the differential gear might be combined with a change speed gear in such a manner that the distribution of the driving torque to the front and rear axle can be changed during operation and consequently a changing adhesive weight of the vehicle can be made full use of.

What I claim is:

A differential gear for power driven vehicles for non-uniformly distributing the driving torque to a plurality of driven members, comprising two coaxial shafts, a bevel sun wheel on each of said shafts, said bevel sun wheels having substantially the same diameter and facing one another and a planet wheel carrier having at least one pair of planet wheels thereon comprising an outer bevel wheel rigidly connected to an inner bevel wheel, and having a larger pitch cone angle and larger diameter than the inner bevel wheel, one of the bevel sun wheels being in driving engagement with the outer bevel wheels of each pair of planet wheels and the other bevel sun wheel in driving engagement with the inner bevel wheels of each pair of planet wheels.

FRANZ ROLLER.